United States Patent [19]

Alvarez

[11] Patent Number: 4,525,923
[45] Date of Patent: Jul. 2, 1985

[54] HEAT SEALING MACHINE FOR BONDING BATTERY COVERS AND BATTERY CASINGS TOGETHER

[76] Inventor: Oscar E. Alvarez, 5700 Mariner S., #701E, Tampa, Fla. 33609

[21] Appl. No.: 563,146

[22] Filed: Dec. 19, 1983

[51] Int. Cl.³ .............................................. B23P 19/00
[52] U.S. Cl. ..................................... 29/730; 29/623.2; 29/731
[58] Field of Search ....................... 29/730, 731, 623.2; 198/339; 228/9, 58

[56] References Cited

U.S. PATENT DOCUMENTS 3,441,448 4/1969 Hayward et al. ................... 29/623.2
3,629,010 12/1971 Hahn ................................. 29/730 X
4,306,355 12/1981 Hawrylo et al. .................. 29/730 X

*Primary Examiner*—Charles F. LeFevour
*Attorney, Agent, or Firm*—A. W. Fisher

[57] ABSTRACT

A heat sealing machine for joining a battery casing and battery cover comprising a battery casing heating station and a battery cover preheating station operatively supported on a machine support frame, the battery casing heating station including a battery casing heater support frame pivotally mounted on the machine support frame having a battery casing heater pivotally attached to one end thereof and a counter balance mounted on the opposite end thereof, the battery cover preheating station including a battery support frame having a battery cover preheater pivotally attached to one end thereof and a counter balance mounted on the opposite end thereof, the machine support frame including a plurality of rollers for lateral movement of the individual battery casings thereon to move the heated battery casing laterally from the battery casing heating station to the battery cover preheating station to receive the preheated battery cover, such that the upper periphery of the battery casing is heated by the battery casing heater and the battery cover is preheated by the battery cover heater to permit bonding therebetween.

7 Claims, 5 Drawing Figures

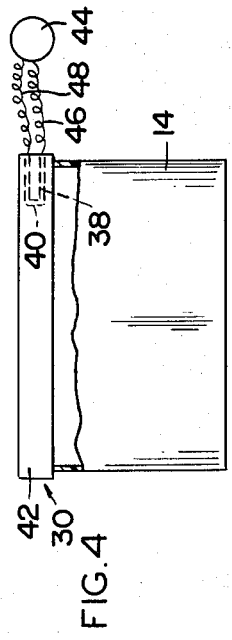
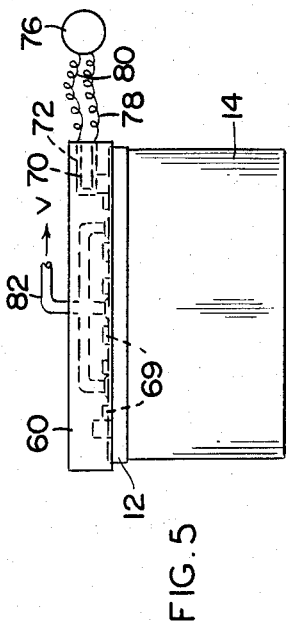
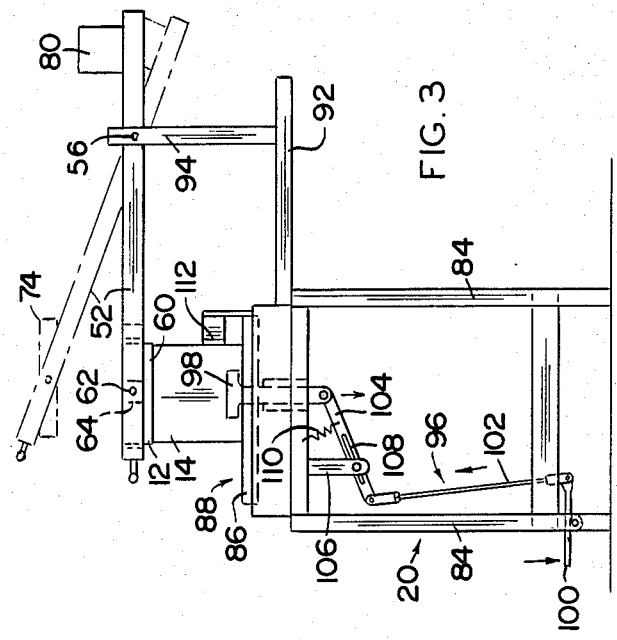
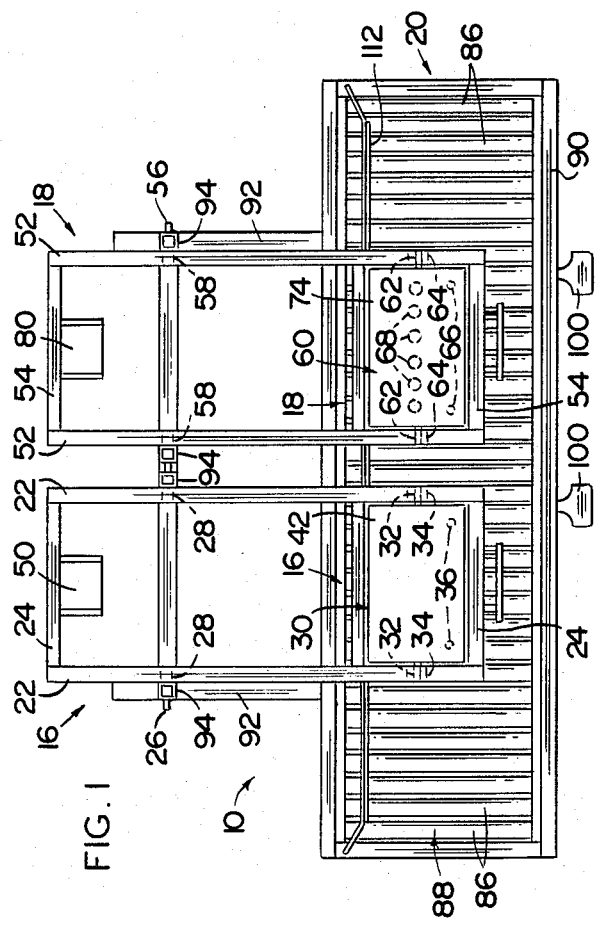
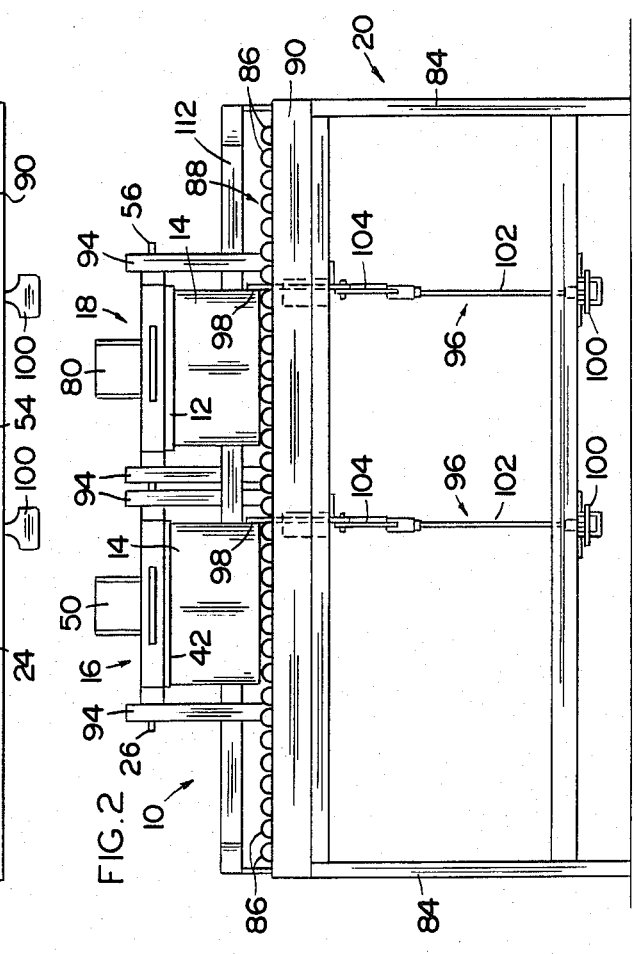

HEAT SEALING MACHINE FOR BONDING BATTERY COVERS AND BATTERY CASINGS TOGETHER

BACKGROUND OF THE INVENTION

1. Field of the Invention

A heat sealing machine for bonding a battery casing and battery cover together.

2. Description of the Prior Art

Various efforts have been made to secure battery covers to battery casings where such covers and casings are constructed of thermo-plastic material, the cover and casing are often joined together in a sealing manner by melting portions of the cover and the casing by heating the cover and casing and joining the melted portions together under pressure.

Unfortunately, in the case of batteries having the poles and connecting bars inserted beforehand and the electrode plates connected thereto, it is not possible to use the heating plate because of the complexity of the construction of the connecting bars and electrode plates existing on the inner side of the cover. This necessitates bonding the cover and the casing together with an adhesive material. However, the liquid integrity of the bonded seams is poor, so the electrolyte is apt to flow into adjacent cells. Moreover, this method of assembly is relatively inefficient.

Examples of the prior art are found in U.S. Pat. Nos. 3,441,448, 3,556,862, 3,778,314, 3,909,300, 4,010,537, 4,025,371, 4,071,661, 4,171,564, 4,306,355, and 4,375,127.

SUMMARY OF THE INVENTION

The present invention relates to a heat sealing machine sealing a battery cover to a battery casing, including a battery casing heating station and a battery cover preheating station operatively supported on a machine support frame.

The battery casing heating station comprises a battery casing heater support frame pivotally coupled to the machine support frame. A battery casing heater pivotally coupled to the battery casing heater support frame comprises a plurality of heating elements within a heater plate. These heating elements are coupled to a temperature regulator to control the temperature thereof. In turn, the temperature regulator is coupled to an electric source.

The battery cover preheating station comprises a battery cover preheater support frame pivotally coupled to the machine support frame. A battery cover heater pivotally coupled to the battery preheater cover support frame comprises a plurality of heating elements disposed within a heater plate. These heating elements are coupled to a temperature regulator to control the temperature thereof. In turn, the temperature regulator is coupled to an electric source.

The machine support frame includes a plurality of rollers forming a roller conveyer to support the battery casing and permit lateral movement thereof from the battery casing heating station to the battery cover preheating station.

In operation, an open battery casing is located beneath the battery casing heater by moving the battery casing on the roller conveyer to engage a stop means. The battery casing heater plate is then rotated downwardly to engage the upper periphery of the battery casing. Since the heater plate is also pivotally disposed within the battery casing heater support frame it engages the periphery of the battery casing with equal pressure to evenly distribute the heat thereon.

As the open battery casing is heated, the battery cover is placed on the battery cover heater plate to preheat the battery cover. The heated battery casing is then moved along the roller conveyer from the battery casing heating station to beneath the battery cover preheating station where the battery cover preheater support frame is rotated downwardly to permit the battery cover to engage the upper periphery of the battery casing. Thus, the bonding therebetween. Once the bond is accomplished, the battery cover preheating support frame is rotated upwardly to permit removal of the unitary battery cover and battery casing from the heat sealing machine itself.

BRIEF DESCRIPTION OF THE DRAWINGS

For a fuller understanding of the nature and objects of the invention, reference should be had to the following detailed description taken in connection with the accompanying drawings in which:

FIG. 1 is a top view of the heat sealing machine.
FIG. 2 is a front view of the heat sealing machine.
FIG. 3 is a side view of the heat sealing machine.
FIG. 4 is a front view of the battery casing.
FIG. 5 is a front view of the battery casing and battery cover combination.

Similar reference characters refer to similar parts throughout the several views of the drawings.

DETAILED DESCRIPTION OF THE PREFERRED EMBODIMENT

As shown in FIGS. 1 and 2, the present invention relates to a heat sealing machine generally indicated as 10 for sealing a battery covery 12 to a battery casing 14. The heat sealing machine includes a battery casing heating station and a battery cover preheating station generally indicated at 16 and 18 respectively operatively supported on a machine support frame generally indicated as 20.

The battery casing heating station 16 comprises a substantially rectangular battery casing heater support frame including a pair of substantially parallel side members, each indicated as 22, held in fixed spaced relationship relative to each other by a pair of substantially parallel end frame members, each indicated as 24. The battery casing heater support frame is pivotally coupled to the machine support frame 20 by a pivot member 26 extending through channels or apertures 28 formed in side members 22 and into a portion of the machine support frame 20. A battery casing heater generally indicated as 30 is pivotally coupled between side frame members 22 by pivot members 32 extending into channels or apertures 34 that formed in side frame members 22. A pair of terminal posts receiving apertures 36 are formed thereon to receive the terminal post of the battery casing 14 as more fully described hereinafter. A plurality of heating elements each indicated as 38 is disposed within channels 40 in heat transfer relationship to a heater plate 42. These heating elements 38 are coupled to a temperature regulator 44 by means of conductors 46 and 48 to control the temperature thereof. In turn, the temperature regulator 44 is coupled to an electric source (not shown). Coupled to the opposite end of the battery casing heater support frame is a counter balance 50 to provide a fulcrum about a pivot member 26 for ease of operation.

The battery cover preheating station 18 comprises a substantially rectangular battery cover preheater support frame including a pair of substantially parallel members, each indicated as 52, held in fixed spaced relationship relative to each other by a pair of substantially parallel end frame members each indicated as 54. The battery cover preheater support frame is pivotally coupled to the machine support frame 20 by a pivot member 56 extending through channels or apertures 58 formed in side frame members 52 and into a portion of the machine support frame 20. A battery cover preheater 60 is pivotally coupled between side members 22 by pivot members 62 extending into channels or apertures 64 formed in the side frame members 22. A pair of terminal posts receiving apertures 66 are formed thereon to receive the terminal posts of the battery casing 14 as more fully described hereinafter. In addition, a plurality of apertures 68 are formed in the battery cover heater 60 to receive the raised lips 69 formed on the upper surface of the battery cover 12. A plurality of heating elements each indicated as 70 are disposed within channels 72 in transfer relationship to a heater plate 74. These heating elements 70 are coupled to a temperature regulator 76 by means conductor 78 and 80 for control thereof. In turn, the temperature regulator 76 is coupled to an electric source (not shown). Coupled to the opposite end of the battery cover heater support frame is a counter balance 80 to provide a fulcrum about a pivot member 56 for ease of operation. In addition, a battery cover retainer such as a vaccum line indicated as 82 are provided to retain the battery cover 12 in heat transfer relationship to the heater plate 74.

The machine support frame 20 comprises four upright members each generally indicated as 84 which operatively support a plurality of rollers 86 forming a roller conveyer generally inity of rollers 86 forming a roller conveyer generally indicated as 88 within a substantially rectangular roller conveyer frame 90. Extending rearwardly from the roller conveyer frame 90 are two pair of substantially parallel horizontally disposed members 92, each having a corresponding pair of substantially parallel vertically disposed members 94 operatively forming a station support means to operatively support the battery casing heater support frame and battery cover heater support frame on pivot members 26 and 56 respectively.

As stop means 96 is provided to properly align the battery casing 14 at the battery casing heating station 16 and battery cover preheating station 18, the stop means 96 comprises a stop element 98 interconnected to foot pedal 100 by a first and second linkage element 102 and 104 respectively. The second linkage element 104 is coupled to attachment member 106 through slot 108 and biased upwardly by spring 110. Guide fence 112 is also provided to provide proper alignment of the battery casing as it progresses along the conveyor 88.

In operation, an open battery casing 14 is located beneath the battery casing heater 30 by moving the battery casing 14 on the roller conveyer 88 to engage stop means 96. The battery casing heater plate 24 is then rotated downwardly to engage the upper periphery of the battery casing 14. Since the heater plate 42 is also pivotally disposed within the battery casing heater support frame, it engages the periphery of the battery casing 14 with equal pressure to evenly distribute the heat thereon. As the open battery casing 14 is heated, the battery cover 12 is placed on the battery cover heater 74 to preheat the battery cover 12. The heated battery casing 14 is then moved along the roller conveyer 88 from the battery casing heating station 16 to beneath the battery cover preheating station 18 where the battery cover 12 to engage the upper periphery of the batter casing 14. Thus, the bonding therebetween. Once the bond is accomplished, the battery cover preheating support frame is rotated upwardly to permit removal of the unitary battery cover and battery casing from the heat sealing machine itself.

It will thus be seen that the objects set forth above, and those made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, What is claimed is:

1. A heat sealing machine for joining a battery casing and battery cover comprising a battery casing heating station and a battery cover preheating station operatively supported on a machine support frame, the battery casing heating station including a battery casing heater support frame pivotally mounted on the machine support frame having a battery casing heater pivotally attached to one end thereof, the battery cover preheating station including a battery support frame having a battery cover preheater pivotally attached to one end thereof, the machine support frame including a plurality of rollers for lateral movement of the individual battery casings thereon to move the heated battery casing laterally from the battery casing heating station to the battery cover preheating station to receive the preheated battery cover, such that the upper periphery of the battery casing is heated by the battery casing heater and the battery cover is preheated by the battery cover heater to permit bonding therebetween.

2. The heat sealing machine of claim 1 wherein said battery casing heater comprises a heater plate pivotally coupled to said battery casing heater support frame having at least one heating element disposed therein, and said battery cover preheater comprises a heater plate pivotally mounted on said battery cover preheater support frame having at least one heating element disposed therein.

3. The heat sealing machine of claim 2 wherein said heater plate of said battery casing heater includes a pair of terminal post receiving apertures formed thereon to receive the terminal post of the battery casing and said heater plate of said battery case preheater includes a pair of terminal post receiving apertures formed thereon to receive the terminal post of the battery casing and a plurality of symmetrically formed apertures to receive protrusions formed on the upper surface of the battery cover.

4. The heat sealing machine of claim 3 further including at least one retainer means to selectively attach the battery cover to said heater plate of said battery cover preheater through at least one of said symmetrically formed apertures.

5. The heat sealing machine of claim 1 wherein said battery casing heater support frame and said battery cover preheating support frame each includes a counter-balance disposed on opposite ends thereof from said respective heater plates to permit ease of pivoting said battery casing heating station and said battery cover preheating station respectively.

6. The heat sealing machine of claim 1 wherein said battery casing heating station and said battery cover preheating station each includes a temperature regulator coupled to said respective heater plates to control the temperature thereof.

7. The heat sealing machine of claim 1 wherein said support frame includes a station support means to operatively support said battery casing heater support frame and said battery preheater support frame, said station support means comprises a first pair of substantially horizontal parallel members extending rearwardly from said machine support frame, each said substantially horizontal parallel member having a substantially vertical member extending upwardly therefrom to receive said battery casing heater support frame and a second pair of substantially horizontal parallel members extending rearwardly from said machine support frame, each said substantially horizontal parallel member having a substantially vertical member extending upwardly therefrom to receive said battery preheating support frame.

* * * * *